United States Patent
Kim

(10) Patent No.: US 9,349,532 B2
(45) Date of Patent: May 24, 2016

(54) TURNING JOINT FOR ELECTRIC EXCAVATOR

(75) Inventor: Ji-Yun Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 429 days.

(21) Appl. No.: 13/885,106

(22) PCT Filed: Nov. 25, 2010

(86) PCT No.: PCT/KR2010/008396
§ 371 (c)(1),
(2), (4) Date: May 13, 2013

(87) PCT Pub. No.: WO2012/070704
PCT Pub. Date: May 31, 2012

(65) Prior Publication Data
US 2013/0234507 A1    Sep. 12, 2013

(51) Int. Cl.
*H01F 3/14* (2006.01)
*H02G 3/00* (2006.01)
(Continued)

(52) U.S. Cl.
CPC ............ *H01F 38/14* (2013.01); *E02F 9/006* (2013.01); *E02F 9/121* (2013.01); *E02F 9/2091* (2013.01); *E02F 9/2095* (2013.01); *H01F 38/18* (2013.01); *H02J 5/005* (2013.01)

(58) Field of Classification Search
CPC .......... H02J 17/00; H02J 5/005; H02J 7/025; H02J 3/01; H01F 38/14; B60L 11/182; B60L 11/1829; B60L 11/1831; Y02T 90/122; H04B 5/0037

USPC ........................................................ 307/9.1
See application file for complete search history.

(56) References Cited

U.S. PATENT DOCUMENTS

| 6,674,836 B2 * | 1/2004 | Harada ................. H05G 1/10 378/107 |
| 2004/0148817 A1 * | 8/2004 | Kagoshima ............. B60K 6/12 37/348 |
| 2010/0236232 A1 | 9/2010 | Boehm et al. |

FOREIGN PATENT DOCUMENTS

| CN | 101355266 A | 1/2009 |
| JP | 63266292 A | 11/1988 |

(Continued)

OTHER PUBLICATIONS

State Intellectual Property Office of People's Republic of China (SIPO) Notification of First Office Action with English Translation (Feb. 3, 2015) (11 pages).

(Continued)

*Primary Examiner* — Kenneth B Wells
*Assistant Examiner* — Rafael Pacheco
(74) *Attorney, Agent, or Firm* — Harness, Dickey & Pierce, P.L.C.

(57) ABSTRACT

The present invention relates to a turning joint for an electric excavator, which includes a direct current/alternating current convertor, an upper coil, a lower coil, and an inverter. A turning joint for an electric excavator (or a hybrid excavator) uses the principle of a transformer to transmit electric energy from the upper portion of the excavator to a travelling body in the lower portion thereof. Thus, even while an upper rotator body of an electric excavator performs a rotating operation, electric power can be supplied to a travelling electric motor in the lower portion of the electric excavator, to thereby perform a travelling operation.

3 Claims, 2 Drawing Sheets

(51) Int. Cl.
    *B60L 3/00* (2006.01)
    *H01F 38/14* (2006.01)
    *B60R 16/03* (2006.01)
    *E02F 9/00* (2006.01)
    *E02F 9/12* (2006.01)
    *E02F 9/20* (2006.01)
    *H01F 38/18* (2006.01)
    *H02J 5/00* (2016.01)

(56) References Cited

FOREIGN PATENT DOCUMENTS

| | | |
|---|---|---|
| JP | 07-067261 | 10/1995 |
| JP | 2001012404 A | 1/2001 |
| JP | 2001-214684 A | 8/2001 |
| JP | 2008066235 A | 3/2008 |
| JP | 2010132023 A | 6/2010 |
| KR | 10-1995-0007221 A | 3/1995 |
| KR | 10-2010-0018969 A | 2/2010 |
| KR | 10-2010-0106215 A | 10/2010 |

OTHER PUBLICATIONS

Office Action in corresponding Japanese Patent Application No. 2013-540873 (3 pages).
International Search Report (in Korean and English) and Written Opinion (in Korean) for PCT/KR2010/008396, mailed Aug. 26, 2011; ISA/KR.
International Preliminary Report on Patentability (Chapter II) (in Korean) for PCT/KR2010/008396, dated Sep. 27, 2012; IPEA/KR.

* cited by examiner $$\frac{E_P}{E_S} = \frac{N1}{N2}$$

TURNING JOINT FOR ELECTRIC EXCAVATOR

TECHNICAL FIELD

The present invention relates to a turning joint for an electric excavator, and more particularly, to such a turning joint for an electric excavator, in which electric power from an upper swing structure can be transferred to a lower traveling structure by applying the principle of an electrical transformer to the upper swing structure in terms of the characteristic of an electric excavator requiring the swing operation to be operated in an equipment employing an electric motor such as the electric excavator (or hybrid excavator).

BACKGROUND ART

In general, an excavator, in particular, an electric excavator is constructed such that its upper swing structure includes a part of a turning point, and thus hydraulic source from the upper swing structure can be transferred to a lower traveling structure without using a hydraulic wiring. For this reason, even in the middle of the swing operation of the upper swing structure of the equipment, the hydraulic source form the upper swing structure can be supplied to a hydraulic motor for traveling of the lower traveling structure to enable the traveling operation to be performed. However, in the electric excavator (or hybrid excavator), in the case where an electric motor is used instead of the hydraulic motor, a power transfer device is needed which has the same concept as that of an existing hydraulic turning joint.

DISCLOSURE OF INVENTION

Technical Problem

Accordingly, the present invention has been developed to satisfy the above-mentioned necessity in the prior art, and it is an object of the present invention to provide a turning joint for an electric excavator, which is constructed such that electric power from an upper swing structure can be transferred to a lower traveling structure by applying the principle of an electrical transformer to the upper swing structure to thereby enable the traveling operation to be performed even in the middle of the swing operation of the upper swing structure of the electric excavator.

Technical Solution

To achieve the above objects, in one aspect, the present invention provides a turning joint for an electric excavator, including: a DC/AC converter positioned at an upper swing structure of the excavator and configured to convert DC electric energy of an electric energy storage device into AC electric energy; an upper coil wound around the upper swing structure and configured to transfer an AC component converted by the DC/AC converter to a lower traveling structure by electromagnetic induction; a lower coil wound around the lower traveling structure and configured to receive an electromotive force of the AC component transferred from the upper coil; and an inverter configured to supply the electromotive force of the AC component transferred from the lower coil to an electric motor for traveling the lower traveling structure, as power required for operation of the electric motor.

Preferably, the turning joint for an electric excavator may further include a power interruption means for supplying the power only when the electric motor for traveling of the lower traveling structure requires the power by interrupting the power from the DC/AC converter so as to reduce an energy loss.

In addition, in the case where a voltage range of the electric energy storage device of the upper swing structure is different from a use voltage range of the electric motor of the lower traveling structure, the voltage may be controlled by the adjustment of the number of windings of both the upper coil wound around the upper swing structure and the lower coil wound around the lower traveling structure.

Advantageous Effects

The turning joint for an electric excavator (or hybrid excavator) according to the present invention is constructed such that electric energy from an upper swing structure can be transferred to a lower traveling structure by applying the principle of an electrical transformer, and even in the middle of the swing operation of the upper swing structure, the power can be supplied to an electric motor for traveling of the lower traveling structure to enable the traveling operation to be performed.

In addition, in the case where a voltage range of the electric energy storage device positioned at the upper swing structure is different from a use voltage range of the electric motor positioned at the lower traveling structure, the voltage can be controlled by the adjustment of the number of windings of both the upper coil wound around the upper swing structure and the lower coil wound around the lower traveling structure.

Further, the power can be supplied only when the electric motor for traveling of the lower traveling structure requires the power, by interrupting the power from the DC/AC converter through a predetermined power interruption, thereby reducing an energy loss.

BRIEF DESCRIPTION OF THE DRAWINGS

The above and other objects, features and advantages of the present invention will be more apparent from the following detailed description taken in conjunction with the accompanying drawings, in which.

EXPLANATION ON REFERENCE NUMERALS OF MAIN ELEMENTS IN THE DRAWINGS

Figure 1:
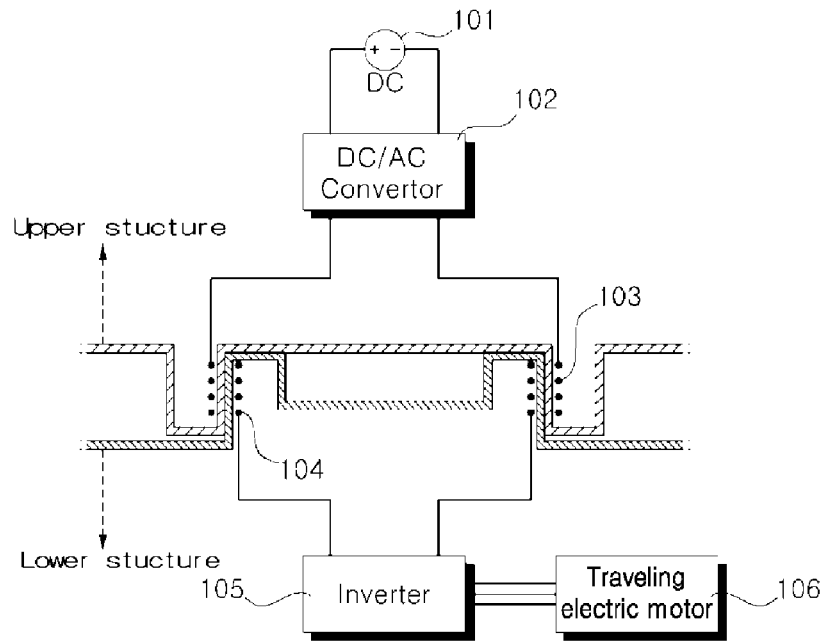
FIG. 1 is a block diagram illustrating the construction of a turning joint for an electric excavator according to the present invention.

101: electric energy storage device
102: DC/AC converter
103: upper coil
104: lower coil
105: inverter
106: traveling electric motor

BEST MODE FOR CARRYING OUT THE INVENTION

Now, a turning joint for an electric excavator according to the preferred embodiments of the present invention will be described hereinafter in detail with reference to the accompanying drawings.

FIG. 1 is a block diagram illustrating the construction of a turning joint for an electric excavator according to the present invention.

As shown in FIG. 1, the inventive turning joint for an electric excavator includes an electric energy storage device 101, a DC/AC converter 102, an upper coil 103, a lower coil 104, an inverter 105, and a traveling electric motor 106.

That is, the turning join for an electric excavator includes: a DC/AC converter 102 positioned at an upper swing structure of the electric excavator (or hybrid excavator) and configured to convert DC electric energy of the electric energy storage device 101 into AC electric energy; an upper coil 103 wound around the upper swing structure and configured to transfer an AC component converted by the DC/AC converter 102 to a lower traveling structure by electromagnetic induction; a lower coil 104 wound around the lower traveling structure and configured to receive an electromotive force of the AC component transferred from the upper coil 103; and an inverter 105 configured to supply the electromotive force of the AC component transferred from the lower coil to an electric motor 106 for traveling the lower traveling structure, as power required for operation of the electric motor.

Additionally, in the case where a voltage range of the electric energy storage device 101 of the upper swing structure is different from a use voltage range of the electric motor 106 of the lower traveling structure, the voltage can be controlled by the adjustment of the number of windings of both the upper coil 103 wound around the upper swing structure and the lower coil 104 wound around the lower traveling structure.

Further, The turning joint for an electric excavator according to the present invention further includes a power interruption means (not shown) for supplying the power only when the electric motor 106 for traveling of the lower traveling structure requires the power by interrupting the power from the DC/AC converter 102 so as to reduce an energy loss.

The upper coil 103 is wound around the upper swing structure and is electrically connected to the DC/AC converter 102. When the DC/AC converter 102 is positioned at the upper swing structure of the electric excavator (or hybrid excavator) and convert DC electric energy of the electric energy storage device 101 into AC electric energy, the AC component converted by the DC/AC converter 102 is transferred to the lower traveling structure by electromagnetic induction. In other words, when an electric current flows in the upper coil 103 wound around the upper swing structure, an electromotive force is induced due to the electromagnetic induction occurring in the lower coil 104. By virtue of this the principle of the electrical transformer, the electric energy from the upper swing structure is transferred to the lower traveling structure.

The lower coil 104 is wound around the lower traveling structure and serves to receive the electromotive force of the AC component transferred from the upper coil 103. The electromotive force of the AC component transferred to the lower coil 104 from the upper coil is transferred to the inverter 105, and then is supplied to the traveling electric motor 106, as power required for operation of the electric motor 106.

The inverter 105 is electrically connected to the lower coil 104 so that when the lower coil 104 wound around the lower traveling structure receives the electromotive force of the AC component transferred from the upper coil 103, the inverter 105 supplies the electromotive force of the AC component transferred from the lower coil 104 to the electric motor 106 for traveling the lower traveling structure, as power required for operation of the electric motor.

MODE FOR INVENTION

The operation of the turning joint for the electric excavator according to the present invention shown in FIG. 1 will be described hereinafter with reference to FIG. 2.

Figure 2:
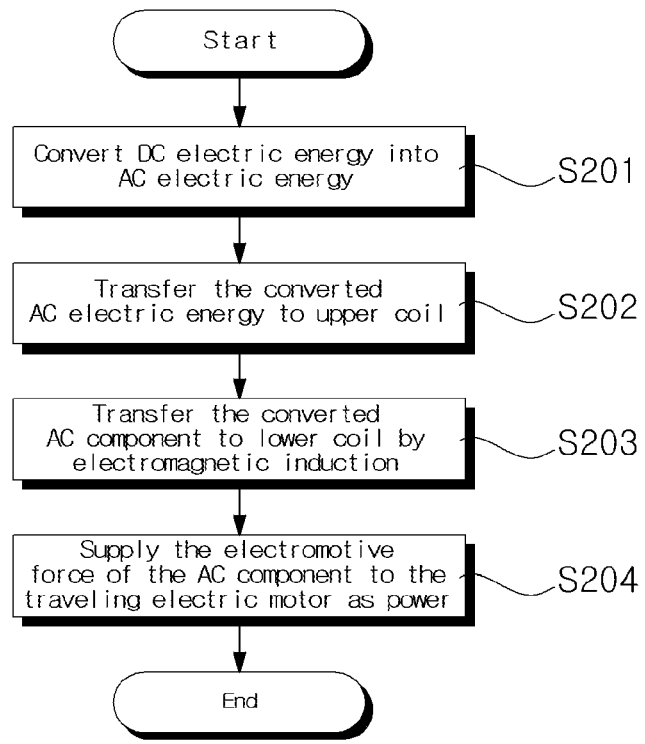
FIG. 2 is a flowchart sequentially illustrating the operation of a turning joint for an electric excavator according to the present invention.

FIG. 2 is a flowchart sequentially illustrating the operation of a turning joint for an electric excavator according to the present invention;

As shown in FIG. 2, first, the DC/AC converter converts DC electric energy of the electric energy storage device 101 into AC electric energy (S201), and then transfers the converted AC electric energy to the upper coil (S202).

That is, the DC/AC converter positioned at the upper swing structure of the electric excavator (or hybrid excavator) and connected to the electric energy storage device 101 converts the DC electric energy into the AC electric energy, and then transfers the converted AC electric energy to the upper coil wound around the upper swing structure.

Subsequently, the upper coil transfers the AC component converted by the DC/AC converter to the lower traveling structure by electromagnetic induction (S203).

That is, when an electric current flows in the upper coil wound around the upper swing structure, an electromotive force is induced due to the electromagnetic induction occurring in the lower coil wound around the lower traveling structure. By virtue of this the principle of the electrical transformer, the electric energy from the upper swing structure is transferred to the lower traveling structure.

Next, the lower coil wound around the lower traveling structure receives the electromotive force of the AC component transferred from the upper coil 103 by the electromagnetic induction.

Them, the inverter supplies the electromotive force of the AC component transferred from the lower coil 104 to the traveling electric motor 106 connected to the inverter, as power required for operation of the electric motor (S204).

By doing so, the electromotive force of the AC component transferred to the lower traveling structure can be used as the power for the electric motor connected to the inverter.

As a result, the electric motor can be operated even in the middle of the swing operation of the upper swing structure to enable the traveling operation to be performed.

In the meantime, in the case where a voltage range of the electric energy storage device 101 positioned at the upper swing structure is different from a use voltage range of the electric motor 106 positioned at the lower traveling structure, the voltage can be controlled by the adjustment of the number of windings of both the upper coil 103 wound around the upper swing structure and the lower coil 104 wound around the lower traveling structure.

Further, the power can be supplied only when the electric motor for traveling of the lower traveling structure requires the power, by interrupting the power from the DC/AC converter through a predetermined power interruption, thereby reducing an energy loss.

As constructed above, the turning joint for the electric excavator of the present invention is constructed such that electric power from the upper swing structure can be transferred to the lower traveling structure by applying the principle of an electrical transformer to the upper swing structure so as to supply the power to the electric motor of the lower traveling structure to thereby enable the traveling operation to be performed even in the middle of the swing operation of the upper swing structure of the electric excavator.

Figure 3:
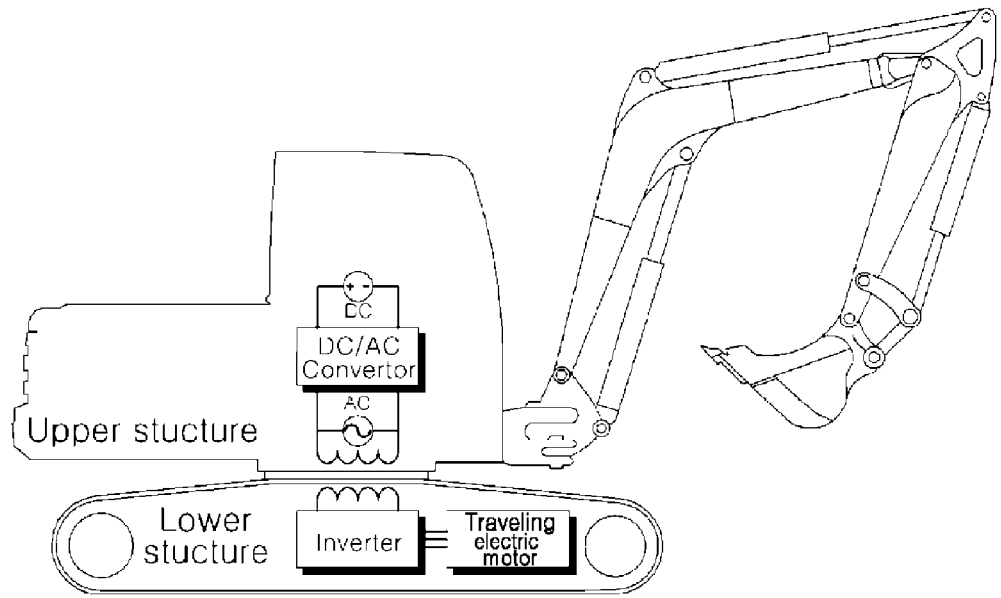
FIG. 3 is a schematic diagrammatic view illustrating an example of an electric excavator equipped with a turning joint according to the present invention.

FIG. 3 is a schematic diagrammatic view illustrating an example of an electric excavator equipped with a turning joint according to the present invention.

As shown in FIG. 3, the inventive turning joint for the electric excavator (or hybrid excavator) includes: a DC/AC converter positioned at an upper swing structure of the excavator and configured to convert DC electric energy of an electric energy storage device into AC electric energy; an upper coil wound around the upper swing structure and configured to transfer an AC component converted by the DC/AC converter to a lower traveling structure by electromagnetic induction; a lower coil wound around the lower traveling structure and configured to receive an electromotive force of the AC component transferred from the upper coil; and an inverter configured to supply the electromotive force of the AC component transferred from the lower coil to an electric motor for traveling the lower traveling structure, as power required for operation of the electric motor.

As such, the turning joint for the electric excavator of the present invention is constructed such that electric power from the upper swing structure can be transferred to the lower traveling structure by applying the principle of an electrical transformer to the upper swing structure so as to supply the power to the electric motor of the lower traveling structure to thereby enable the traveling operation to be performed even in the middle of the swing operation of the upper swing structure of the electric excavator.

Figure 4:
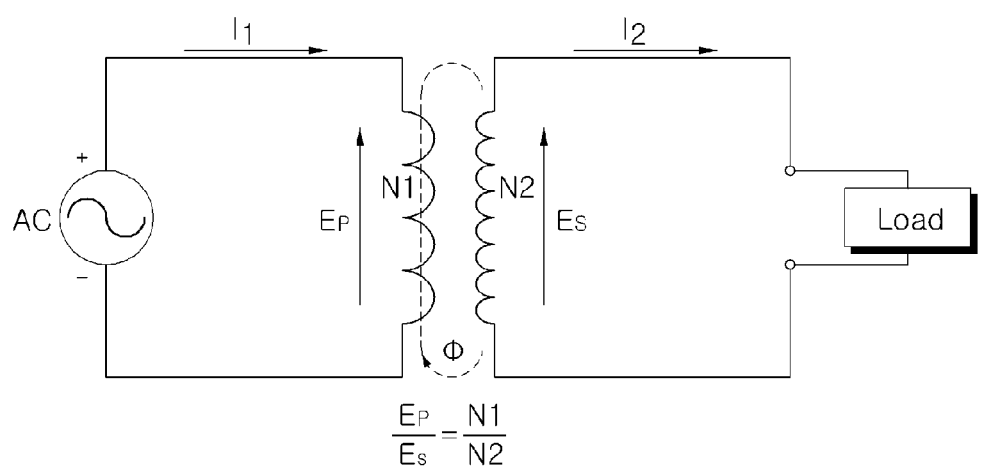
FIG. 4 is a schematic diagrammatic view illustrating the principle of an electrical transformer used in the present invention.

FIG. 4 is a schematic diagrammatic view illustrating the principle of an electrical transformer used in the present invention.

As shown in FIG. 4, a typical electrical transformer is composed of a primary winding connected to a sine wave power source and a secondary winding connected to a load. In addition, a magnetic flux is produced in the clockwise direction due to the sine wave power source of the primary winding, and voltage which is proportional to the number of windings (N1, N2) of the coils and the rate of change in the magnetic flux is generated from the respective coils. When it is assumed that there is no leakage, the same amount of magnetic flux exists at both coils. Thus, the reverse electromotive forces (Ep, Es) proportional to the number of windings of the coils are produced from the primary and secondary windings. In addition, the voltage generated from each coil by Lenz's law is strayed in the direction of hindering the generation of the voltage. Thus, the reverse electromotive force Ep generated from the primary coil is applied in the opposite direction to that of the sine wave power source. A reverse electromotive force is generated from the secondary coil in the opposite direction to that of a magnetic flux produced in a coil window. This principle of the electrical transformer is applied to the turning joint for the electric excavator of the present invention to enable the power from the upper swing structure to be supplied to the lower traveling structure. The principle of the turning joint applied to and used in the excavator is the same as the above.

INDUSTRIAL APPLICABILITY

According to the turning point for an electric excavator of the present invention, application of the principle of an electrical transformer to the upper swing structure can solve a problem in that electric power from the upper swing structure cannot be transferred to the lower traveling structure through a wiring in terms of the characteristic of an electric excavator requiring the swing operation to be operated in an equipment employing an electric motor such as the electric excavator (or hybrid excavator).

The invention claimed is:

1. A turning joint for an electric excavator, comprising:
  a DC/AC converter positioned at an upper swing structure of the excavator and configured to convert DC electric energy of an electric energy storage device into AC electric energy;
  an upper coil wound around the upper swing structure and configured to transfer an AC component converted by the DC/AC converter to a lower traveling structure by electromagnetic induction;
  a lower coil wound around the lower traveling structure and configured to receive an electromotive force of the AC component transferred from the upper coil; and
  an inverter configured to supply the electromotive force of the AC component transferred from the lower coil to an electric motor for traveling the lower traveling structure, as power required for operation of the electric motor; and
  a power interruption means for supplying the power only when the electric motor for traveling of the lower traveling structure requires the power by interrupting the power from the DC/AC converter so as to reduce an energy loss.

2. The turning joint for an electric excavator according to claim 1, wherein in the case where a voltage range of the electric energy storage device of the upper swing structure is different from a use voltage range of the electric motor of the lower traveling structure, the voltage is controlled by the adjustment of the number of windings of both the upper coil wound around the upper swing structure and the lower coil wound around the lower traveling structure.

3. A turning joint for an electric excavator, comprising:
  a DC/AC converter positioned at an upper swing structure of the excavator and configured to convert DC electric energy of an electric energy storage device into AC electric energy;
  an upper coil wound around the upper swing structure and configured to transfer an AC component converted by the DC/AC converter to a lower traveling structure by electromagnetic induction;
  a lower coil wound around the lower traveling structure and configured to receive an electromotive force of the AC component transferred from the upper coil; and
  an inverter configured to supply the electromotive force of the AC component transferred from the lower coil to an electric motor for traveling the lower traveling structure, as power required for operation of the electric motor;
  wherein in the case where a voltage range of the electric energy storage device of the upper swing structure is different from a use voltage range of the electric motor of the lower traveling structure, the voltage is controlled by the adjustment of the number of windings of both the upper coil wound around the upper swing structure and the lower coil wound around the lower traveling structure.

* * * * *